(12) United States Patent
Dogariu

(10) Patent No.: US 6,807,375 B2
(45) Date of Patent: Oct. 19, 2004

(54) FREE-SPACE OPTICAL COMMUNICATIONS WITH PARTIALLY COHERENT BEAMS

(75) Inventor: Aristide Dogariu, Winter Springs, FL (US)

(73) Assignee: University of Central Florida, Orlando, FL (US)

( * ) Notice: Subject to any disclaimer, the term of this patent is extended or adjusted under 35 U.S.C. 154(b) by 643 days.

(21) Appl. No.: 09/757,158

(22) Filed: Jan. 9, 2001

(65) Prior Publication Data

US 2004/0126116 A1 Jul. 1, 2004

(51) Int. Cl.$^7$ ............................................. H04B 10/00
(52) U.S. Cl. ....................................... 398/130; 398/118
(58) Field of Search ................................ 398/118, 130, 398/140–141, 182, 202

(56) References Cited

U.S. PATENT DOCUMENTS 4,085,319 A * 4/1978 Deitz et al. .................. 398/185

\* cited by examiner

Primary Examiner—Kinfe-Michael Negash
(74) Attorney, Agent, or Firm—Brian S. Steinberger; Law Office of Brian S. Steinberger, P.A.

(57) ABSTRACT

This disclosure relates to a laser communication system for transmitting intelligence by means of partially coherent optical energy. The system provides improved transmission of intelligence from a transmitter site through non-confined free space and receiving said intelligence at a receiver site remote from and physically separate from said transmitter by non-confined free space. The system has a optical source at the transmitter site for producing a beam of spatially-coherent monochromatic, aperture limited electromagnetic optical energy as well as a modulator for modulating said beam with intelligence-bearing information to develop wavefronts of mutually-aligned orientation which beam is thereafter modified to partial coherence and a receiver site for both detecting said information in said partially coherent beam and deriving said demodulated information. The partially coherent beam has an a of preferably from 0.05 to 0.5 whereby improved reception is realized from optical communication over free-space of limited distances. Partial coherence of a coherent beam is achieved by numerous ways including passing it through a phase screen, or reflecting it against a rough surface, multimode laser operation or transmission through multimode optical fibers.

16 Claims, 4 Drawing Sheets turbulence - off turbulence - on

Ratio of the widths = 1.7

Ratio of the widths = 1.34

FREE-SPACE OPTICAL COMMUNICATIONS WITH PARTIALLY COHERENT BEAMS

BACKGROUND AND PRIOR ART

With the advent of the laser, many devices were soon developed for both steering and modulating information-bearing intelligence upon the near infrared and visible optical beam produced by the laser. It was quickly recognized that its spatially coherent monochromatic electromagnetic optical energy enabled its beam to carry wideband information. That is, audio, video or digital information, which conveyed intelligence, could be modulated upon and transmitted by means of the laser beam because of its spectral qualities.

The development of improved gas and solid state lasers for feeding optical-fibre systems for transmission of information has also lead to the development of free-space or atmospheric optical systems such as is disclosed in U.S. Pat. No. 4, 627,106. It is taught therein that a beam of spatially coherent, monochromatic, aperture limited, electromagnetic optical energy can be modulated, thereafter propagated through free space as mutually aligned wavefronts and subsequently detected by a receiving means for deriving and utilizing the information provided by the modulation. The document teaches the importance of maintaining the wavefront alignment in orientation throughout the system less the information becomes garbled by intermixing of the waves.

Thus, optical free-space communication channels have been established using laser sources in both the visible and infra-red wavelength bands. Their high directionality is one of most appealing characteristics of laser beams and this property is often associated with their high degree of spatial coherence and sought as such in optical free-space transmissions (see U.S. Pat. Nos.: 4,764,982; 4,928,317; and, 5,457,561).

High volume communication systems is perhaps the most rapidly developing economic sector. Advances in fiber optic communication systems have brought tremendous market opportunities. One potential bottleneck in the wide spread of fiber optic systems is the "last mile" connection to consumers as well as specific requirements of "local area networks". For obvious economic reasons, the first choice in these situations in communication systems is the broadband wireless systems. The available options are radio, microwave, and free-space optical connections. Optical free-space communication systems have definite advantages such as: broadband; inexpensive multiplexing; no special operation licensing (unlike microwaves); ease of installation and fast deployment; highly secure (direct link); and, fully portable.

Operation at more than 2.5 Gbits/second has been demonstrated for using broadband, ultrahigh speed optical transmission over few miles. In principle, full benefits of fiber optic communications (speed, volume, etc.) can be obtained in free-space connections.

There is however one potential drawback; light beams propagation even over distances of few kilometers can be affected by adverse conditions like atmospheric turbulences, rain or aerosols. As a result, beam wondering and/or attenuation could lead to a decrease in the degree of confidence of a free-space optical communication channel. The problem is especially relevant for situations where the atmospheric conditions change rapidly, in regions where humidity is high or where substantial amount of particulates is present in the horizontal communication path (for instance, desert or coastal regions). Obviously, these issues limit the distances over which secure optical communications can be operated.

To limit such atmospheric effects, the complexity of an optical communication system has to be increased. This usually means that several optical channels are needed to be operated in parallel and the transmitted information is cross-correlated to account for different perturbations in different channels. To limit the beam distortions, one can enlarge the size of the transmitted beam but this eventually limits the range of practical applications since the major advantages of an optical system are its size, ease of installation and operation.

SUMMARY OF THE INVENTION

The first objective of the present invention is to provide stable free-space optical communications.

The second object of this invention is to provide stable free-space optical communication in adverse atmospheric conditions.

The third object of this invention is to utilize low-coherence optical beams to provide for stable free-space optical communications.

The fourth objective is to provide for a stable free-space optical communications system of enhanced stability utilizing a laser generated partially coherent optical beam propagated through turbulent atmospheres The fifth objective is to develop a modulated laser source that will be appropriate for advanced telecommunications and optical signal processing applications.

A preferred embodiment fully describing the invention (which arose out of the discovery that partially coherent laser generated optical beams are less influenced upon propagation through turbulent free-space atmospheres than are coherent optical beams) is a communication system for transmitting intelligence from a transmitter site through non-confined free space and receiving said intelligence at a receiver site remote from and physically separate from said transmitter by non-confined free space, said system comprising: means at said transmitter site for producing a beam of spatially-coherent monochromatic, aperture limited electromagnetic optical energy; means for modulating said beam with intelligence-bearing information to develop wavefronts of mutually-aligned orientation; means for modifying said beam to partial coherence; means at said receiver site for detecting said information in said partially coherent beam; and, means for deriving said information demodulated from said detecting means.

Further objects and advantages of this invention will be apparent from the following detailed description of a presently preferred embodiment, which is illustrated, schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

In most situations of interest for the present application, spatial coherence is a measure of the uniformity of the front of an optical field Within the context of second-order coherence theory, it is known that highly directional beams can be generated from globally incoherent sources. "Optical Coherence and Quantum Optics:, L. Mandel and E. Wolf, Cambridge University Press, 1995.

In general, an optical source can be characterized by the half-width of the intensity across the source $w_0$, the half-width $\sigma_0$ of the distribution of spatial coherence, and the wavelength $\lambda$ of radiation.

The beam profile at an arbitrary propagation distance z is therefore given by $w(z)=w_0[1+(z/b)2]^{1/2}$, where $b=\pi w_0 \beta/\lambda$, $\beta=(1+\alpha-2)-\frac{1}{2}$, and $\alpha=\sigma_0/w_0$. The quantity $\alpha$ is called the global degree of coherence and, in an arbitrary transverse plane the coherence function obeys the law $\sigma(z)=w(z)\sigma_0/w_0$, i.e. $\alpha$ remains constant in propagation. It follows immediately that the far-field diffraction angle is of the order of $\lambda/\pi\beta w_0$ similar to the familiar diffraction of a fully coherent laser beam. In the case of a laser beam, $\alpha$ tends to infinity and, correspondingly, $\beta=1$. Therefore, a similar diffraction angle will be produced by a laser beam of width $w_L=w_0(1+\alpha-2)^{-1/2}$. In conclusion, by controlling simultaneously the intensity and coherence profile of a partially coherent beam, one can obtain directionality properties similar to those of traditional laser beams.

It was anticipated that the spatial coherence properties of optical beams will change upon propagation through inhomogeneous media when the phase front is randomized. Experiments indicate that, when, initially coherent, optical waves propagate through inhomogeneous media, the wave front phase uniformity degrades much faster with increasing the propagation distance than the decay of the wave intensity. It has also been known that, upon free-space propagation, the statistical properties and the global shape of such beams evolve. E. Wolf and E. Collett, Opt. Communications 25, 293, (1978)

In the case of partially coherent beams, the phase front is already distorted before propagation through the distorted atmosphere. It is experimentally found that, upon propagation, further phase randomization will not affect certain spatial coherence properties.

Figure 1:
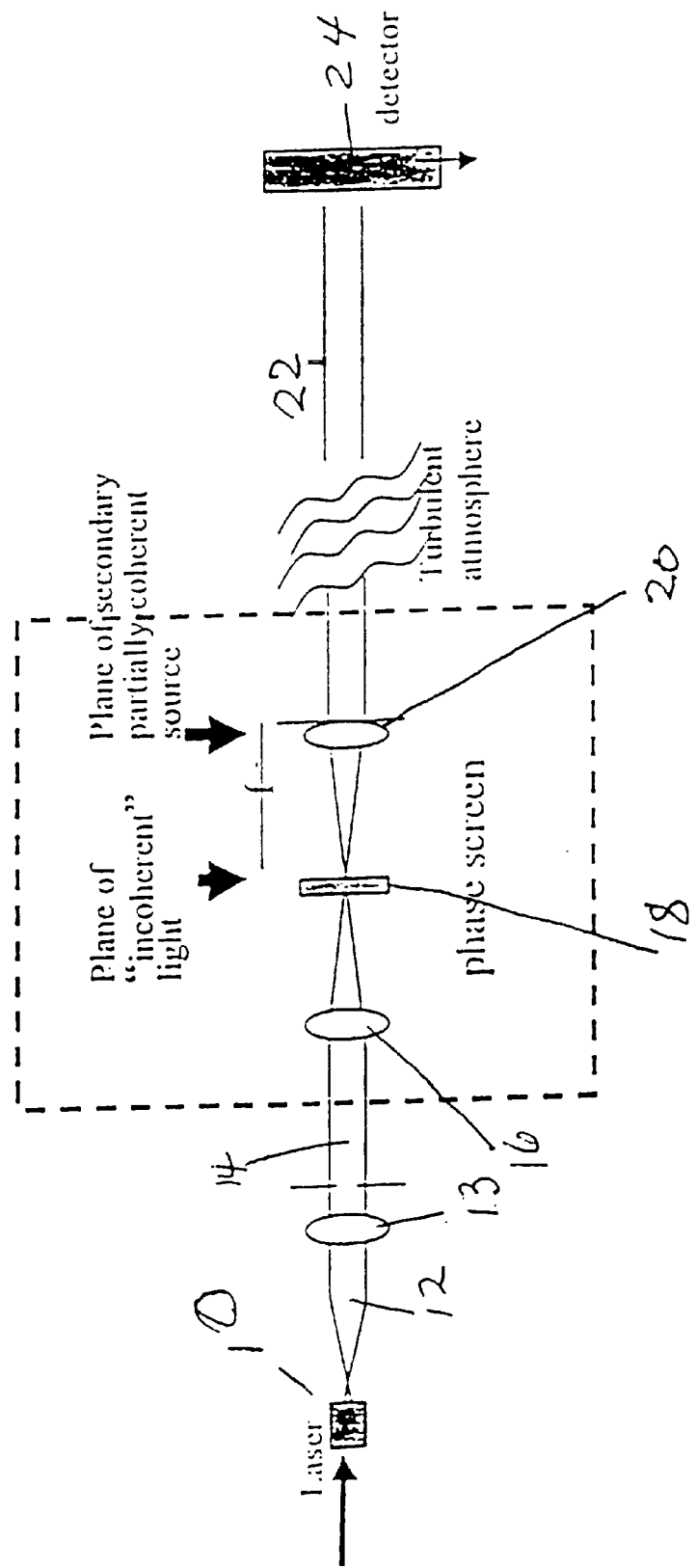
FIG. 1 is a schematic setup providing for generation of partially coherent beams by varying the beam size in which beam was propagated through conditions of turbulence and non-turbulence.
Figure 2:
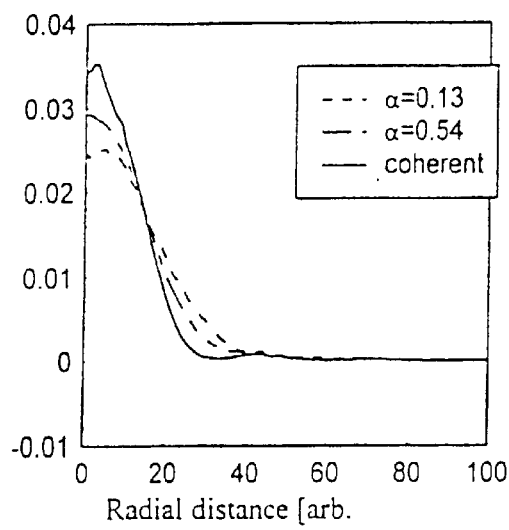
FIG. 2 shows curves of the radial distance with the turbulence off obtained from data generated with the setup of FIG. 1.
Figure 3:
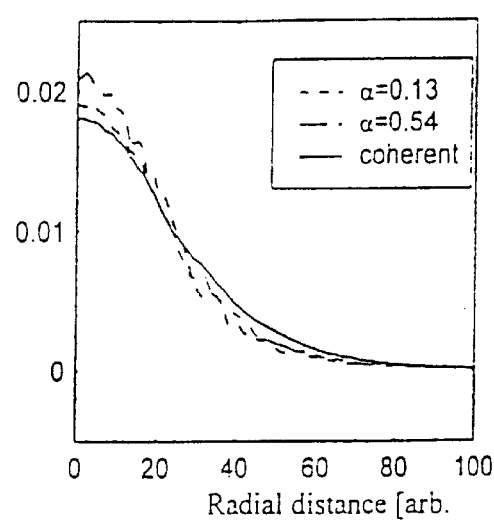
FIG. 3 shows curves of the radial distance with the turbulence on obtained from data generated with the setup of FIG. 1.
Figure 4:
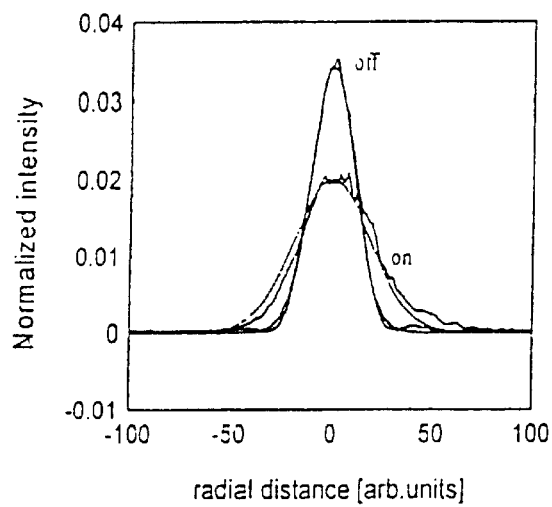
FIG. 4 shows curves of the normalized intensity plotted against the radial distance for a coherent beam obtained from data generated with the setup of FIG. 1.
Figure 5:
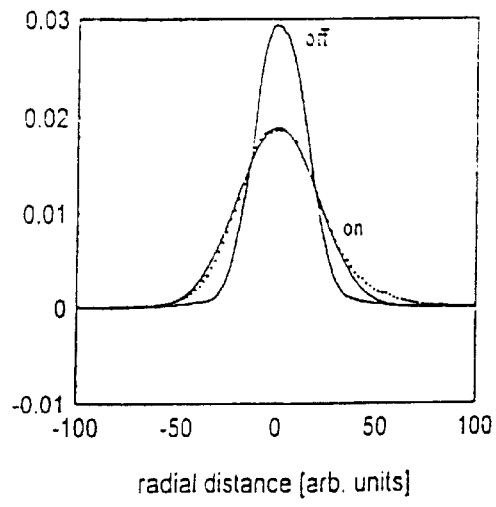
FIG. 5 shows curves of the normalized intensity plotted against the radial distance for a partially coherent beam obtained from data generated with the setup of FIG. 1.

This is exemplified in FIG. 1 where results of a propagation experiments are presented. Laser 10 is used to generate a beam 12 of monochromatic light of 633 nm wavelength that is aperture limited and if desired modulated. Lens 13 directs the beam 14 to lens 16 so as to be focused onto a phase screen 18 at the plane of "incoherent light" which beam 14 thereafter passes through another lens 20 to provide at this point a plane of "secondary partially-coherent" collimated beam of radiation which passes into free space 22 (turbulent atmosphere on or off) and then onto a detector 24. For purposes of use of this FIG. 1 as representative of a communication system the laser 10 represents the transmitter and modulator of the beam 12 to introduce the intelligence and the detector 24 would represent both the receiver site and the demodulating means whereby the intelligence from the beam 12 could be understood.

Several situations of propagation in free-space and through thermally induced turbulence were analyzed and the results plotted in the several FIGS. 2 to 5. The global degree of coherence $\alpha$ of the secondary partially coherent source was adjusted by varying the beam size $w_0$. The width of the far-zone intensity distribution was characterized for both a laser beam and a partially coherent beam by assuming a Gaussian intensity profile.

The ratio between the half-width corresponding to beams propagating through free space (turbulence—on) and free-space (turbulence—off) was evaluated. In the specific case of a coherent beam and a partially coherent beam with $\alpha=0.13$ this ratio was 1.7 and 1.34, respectively.

This experiment demonstrates that the partially coherent beam was practically less distorted by the propagation through turbulence. As earlier noted, experimental intensity profiles are shown in the FIGS. 2–5.

The example uses a HeNe laser. Other semiconductor laser diodes such as GaAs and AlGaAs, and the like can be used. Additional lasers can be used such as but not limited to optical fiber lasers such as erbium, praesodimium, and the like. Solid state lasers can also be used such as but not limited to YAG, fosterite, LiSAF, and Ti:$Al_2O_3$, and be used. Other semiconductor lasers can also be used such as but not limited to vertical cavity lasers, InP, InGaAs, InGaAsP, GaN, InGaAIN, and the like. Still other semiconductor lasers can be used such as InAlGaAs, and InAlGaP, and the like. Still other lasers can be used such as but not limited to diode pumped lasers, gas lasers, waveguide lasers, and the like since each needs only to pump out a coherent optical beam suitable for free space transmission of intelligence. The principle of this invention is not limited to the use of narrow wavelength—band lasers. Semiconductor devices such as super luminescent diodes (SLD) or light emitting diodes (LED) can be used to produce the thought spatial coherence properties.

Figure 6:
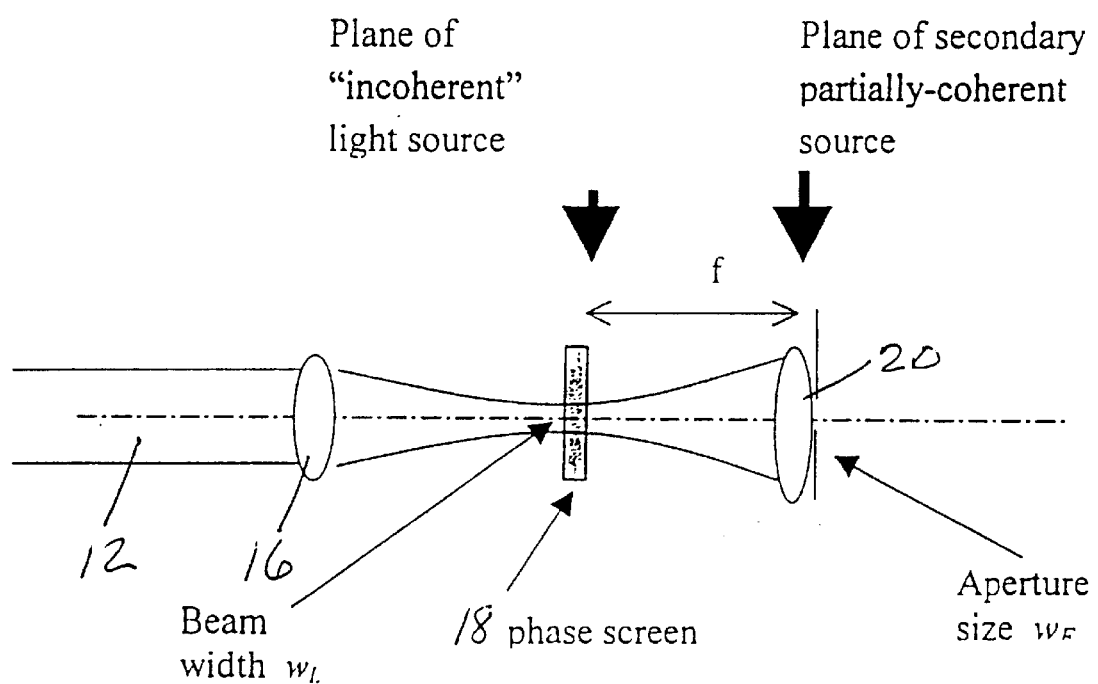
FIG. 6 is a schematic setup providing for generation of partially coherent beams by using phase screens.

The partially coherent beams useful in this invention range from L=0.01 to L=1 and preferably from 0.05 to 0.5 and optimally at about 0.2. The optimum value for L should be determined by the specifics of the atmosphere turbulence. There are no restrictions for $w_0$ Useful partially coherent waves include all those laser generated frequencies including infra-red, near infra-red and visible optical beams which can be modulated with appropriate intelligence. There are numerous ways of generating partially coherent waves including the use of a phase screen as disclosed in the description of FIG. 1. Reference should now be made to FIG. 6 which presents an enlarged view of the region of the phase screen pictured in FIG. 1. A phase screen 18 is constructed, by example, from a diffuse transmitting object such as a ground glass. A ground glass is characterized by its refractive index n and by the correlation length of its surface profile L corr and by the rms surface height variation R. General conditions for generating a partially coherent light source in the plane as indicated are (i) large number of independent scattering units in the illumination area, i.e wL >>L corr (ii) large phase fluctuation introduced by the "phase screen", i.e. $(2\pi Rn/\lambda)>1$. Other materials which can be used as the phase screen include liquid crystals, polymer layered materials or any other microstructured of natural material which can produce phase alteration of a laser beam without considerable amplitude attenuation.

If these conditions are satisfied, the degree of coherence of the beam generated according to FIG. 1 is given by $\alpha=(\lambda f/\pi wF\ wL)$. Typical values could be a are between 0.1 and 0.5; for a coherent beam, $\lambda=1$.

Figure 7:
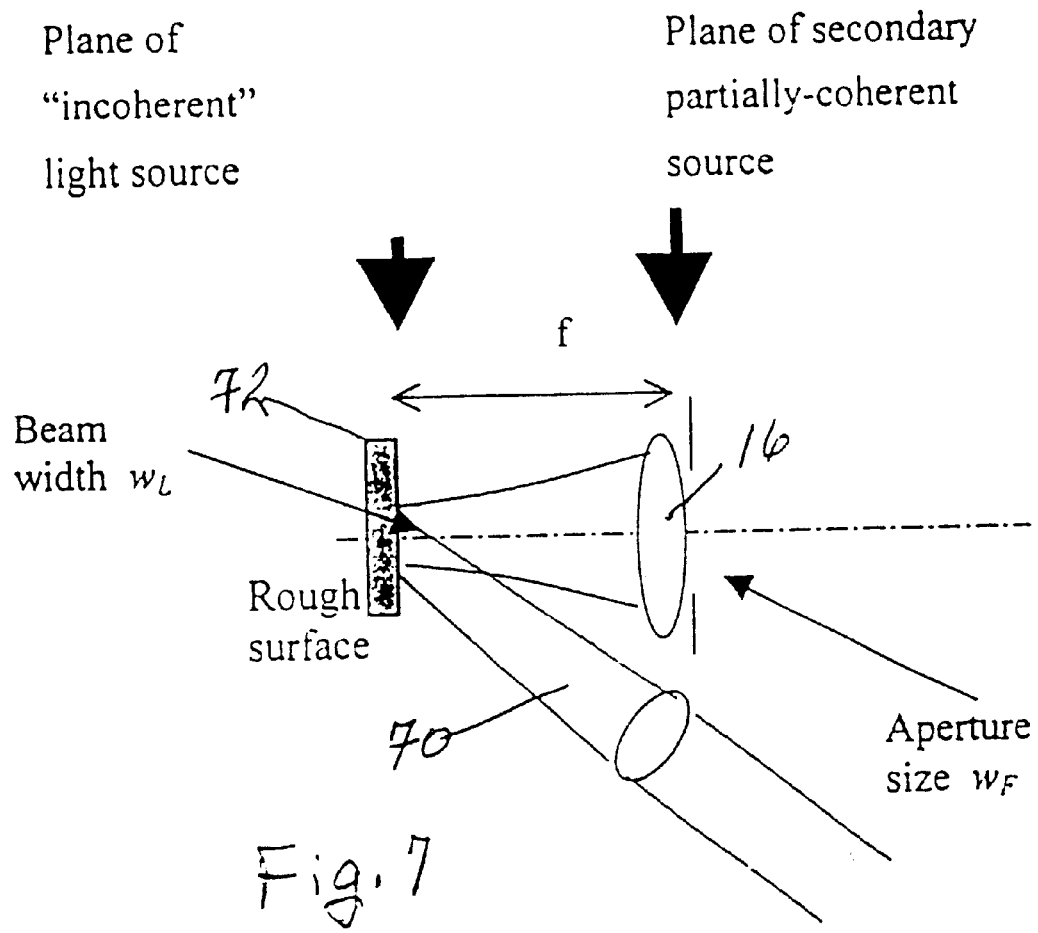
FIG. 7 is a schematic setup providing for generation of partially coherent beams by using reflectors.

Another approach to providing similar results of partially coherent beams can be obtained in a reflection geometry using the reflection from a rough surface. This is illustrated in FIG. 7 where the partially coherent beam 70 is reflected from the rough surface 72 toward the detector 24 (not shown). Examples of rough surfaces include but are not limited to ground glass, highly reflective metallic surfaces such as Al, chemically etched glass and semiconductor materials. Similar analysis for the coherence parameter a has to be developed in this case by considering that the phase fluctuations introduced by the "rough surface" $(2\pi Rn/\lambda)>1$ where n is now the refractive index of the medium in which the surface is embedded.

Partially coherent sources can be obtained by superposition of replicas of laser fields or by laser source oscillating simultaneously in a multitude of independent transverse modes, i.e. multimode laser operation. The spatial distribution of the emitted laser light depends on he geometry of the resonator. Typical laser resonators support a hierarchy of transverse electric and magnetic modes. Lasers can be operated in multimode by adjusting the resonator (for example). Another approach to realizing essentially similar partial coherence properties can be obtained by adjusting the propagation through a fiber optic where a finite number of modes are permitted. Optical fibers can be standard single mode fiber, multimode fiber, single mode polarization fiber, dispersion tailored, fiber, and the like. Multimode fibers allow intermodally dispersed wavelengths. That is, the propagation of rays of the same wavelength follow different paths through the fiber, causing different arrival times and therefore loss of coherence at the exit port of the fiber. The number of permitted modes can be assimilated to l/a.

An increasing number of companies are currently interested in pursuing competing technologies for "last mile " communications which means that optical free-space systems are a cost effective alternative to fiber optic or microwave based communication technologies. This invention provides an optical communication means, which is clearly superior to known optical free-space transmission systems.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A communication system for transmitting intelligence from a transmitter site through non-confined free space and receiving said intelligence at a receiver site remote from and physically separate from said transmitter by non-confined free space, said system comprising:

means at said transmitter site for producing a beam of spatially-coherent, aperture limited electromagnetic optical energy;

means for modulating said beam with intelligence-bearing information to develop wavefronts of mutually-aligned orientation;

means for modifying said beam to a partially coherent beam having a degree of coherence $\alpha$ of approximately 0.01 to approximately 1;

means at said receiver site for detecting said information in said partially coherent beam; and, means for deriving said information demodulated from said detecting means.

2. The system of claim 1 wherein said modifying means includes a phase screen and a lens forming a plane of an incoherent light source spaced apart a distance f from a plane of secondary partially-coherent source .

3. The system of claim 1 wherein said modifying means is a phase screen formed by ground glass having an refractive index of 1.5.

4. The system of claim 1 wherein said modifying means is a rough reflective body.

5. The system of claim 1 wherein said modifying means is a multimode laser.

6. The system of claim 1 wherein said modifying means is a multimode optical fiber.

7. The system of claim 2, wherein the degree of coherence $\alpha=(\lambda f/\pi W_F W_L)$, where $\lambda$ is equal to approximately 1, f is spacing between the plane of the incoherent light source and the plane of the secondary partially-coherent light source, $W_F$ is the Beam width at the phase screen, $W_L$ is aperture size of the lens.

8. The system of claim 7, wherein the degree of coherence $\alpha$ is approximately 0.1 to approximately 0.5.

9. A method of transmitting from a transmitter to a receiver through an atmosphere of free-space comprising the steps of:

producing a beam of spatially-coherent, aperture limited electromagnetic optical energy means at said transmitter site;

modulating said beam with intelligence-bearing information;

modifying said beam to partially coherent beam having a degree of coherence $\alpha$ approximately 0.01 to approximately 1;

detecting said information in said partially coherent beam means at said receiver site; and, deriving said information from said detecting means.

10. The method of claim 9, wherein said modifying step includes the step of: modifying by a phase screen and a lens forming a plane of an incoherent light source spaced apart a distance f from a plane of secondary partially-coherent source.

11. The method of claim 9 wherein said modifying step includes the step of: modifying by a phase screen formed of ground glass having an refractive index of 1.5.

12. The method of claim 9 wherein said modifying step includes the step of: modifying by a rough reflective body.

13. The method of claim 9 wherein said modifying step includes the step of: modifying by a multimode laser.

14. The method of claim 9 wherein said modifying step includes the step of: modifying by a multimode optical fiber.

15. The method of claim 9, wherein said modifying step includes the step of: modifying said beam to the partially coherent beam $\alpha$ by $(\lambda f/\pi W_F W_L)$, where $\lambda$ is equal to approximately 1, f is spacing between the plane of the incoherent light source and the plane of the secondary partially-coherent light source, $W_F$ is the Beam width at the phase screen, $W_L$ is aperture size of the lens.

16. The method of claim 15, wherein the degree of coherence $\alpha$ is approximately 0.1 to approximately 0.5.

* * * * *